United States Patent [19]

Forth et al.

[11] Patent Number: 4,787,095
[45] Date of Patent: Nov. 22, 1988

[54] PREAMBLE SEARCH AND SYNCHRONIZER CIRCUIT

[75] Inventors: Leslie Forth; Raymond S. Duley, both of Austin, Tex.

[73] Assignee: Advanced Micro Devices, Inc., Sunnyvale, Calif.

[21] Appl. No.: 21,287

[22] Filed: Mar. 3, 1987

[51] Int. Cl.$^4$ .............................................. H04L 7/00
[52] U.S. Cl. ..................................... 375/114; 375/116
[58] Field of Search ............... 375/114, 116, 117, 115, 375/113; 370/48, 100

[56] References Cited

U.S. PATENT DOCUMENTS 3,808,367  4/1974  Wigner et al. ...................... 375/114
4,541,104  9/1985  Hirosaki ............................. 375/114

Primary Examiner—Robert L. Griffin
Assistant Examiner—Marianne Huseman
Attorney, Agent, or Firm—Davis Chin; J. Vincent Tortolano

[57] ABSTRACT

A preamble search and synchronizer circuit for detecting a preamble pattern within data input signals and synchronizing it with a clock signal associated with a StarLAN coded data transceiver includes a synchronizer start circuit, a counter circuit, and a pattern detector circuit. The synchronizer start circuit is responsive to the complement of the data input signals and the clock signal for generating a start signal which is synchronized with the clock signal. The counter circuit is responsive to the start signal and the complement of the clock signal for generating a gated clock signal. The pattern detector circuit is responsive to the start signal, the data input signals and the gated clock signal for sampling of the data input signals and for generating a synchronized output signal upon detection of a predetermined data sequence indicative of the preamble pattern.

20 Claims, 4 Drawing Sheets

PREAMBLE SEARCH AND SYNCHRONIZER CIRCUIT

DESCRIPTION

BACKGROUND OF THE INVENTION

This invention relates generally to digital communication networks and more particularly, it relates to a preamble search and synchronizer circuit used with digital receiver circuitry in a StarLAN coded data transceiver for reception of local area network messages.

In StarLAN (an acronym for Star Local Area Network) methodology which is governed by proposed specification IEEE P802.3-86/0.06G entitled "Physical Signaling, Medium Attachment, and Baseband Medium Specifications, Type 1 Base 5", a serial data input signal containing a preamble pattern must be transmitted at the beginning of a frame transmission prior to the start of a serial data packet (message). This preamble pattern in the data input signal is required to be detected and synchronized with a clock signal generated within the receiver circuitry of the transceiver for producing a synchronized signal which activates or enables a Manchester code detector circuit.

It would therefore be desirable to provide a preamble search and synchronizer circuit like that of the present invention which allows for the rapid detection of the preamble pattern in the data input signal and synchronizes it with the clock signal to produce a synchronized signal. By selection of circuit components and functions, the preamble search and synchronizer circuit of the instant invention is capable of being fabricated with a StarLAN coded transceiver as a part of a single monolithic integrated circuit in a compact and efficient configuration.

SUMMARY OF THE INVENTION

Accordingly, it is a general object of the present invention to provide a preamble search and synchronizer circuit which is relatively simple and economical to manufacture and assemble.

It is an object of the present invention to provide a preamble search and synchronizer circuit which includes pattern detector means responsive to a start signal and a gated clock signal for sampling of data input signals and for generating a synchronized output signal upon detection of a predetermined data sequence indicative of a preamble pattern in the data input signals.

It is another object of the present invention to provide a preamble search and synchronizer circuit which is formed of a synchronizer start circuit, a counter circuit, and a pattern detector circuit for detecting a preamble pattern within data input signals and for synchronizing it with a clock signal associated with a StarLAN coded data transceiver.

It is still another object of the present invention to provide a preamble search and synchronizer circuit for use with a StarLAN coded data transceiver which may be formed as a part of a single monolithic integrated circuit.

In accordance with these aims and objectives, the present invention is concerned with the provision of a preamble search and synchronizer circuit for detecting a preamble pattern within data input signals and for synchronizing it with a clock signal associated with a StarLAN coded data transceiver which includes a synchronizer start circuit, a counter circuit, and a pattern detector circuit. The synchronizer start circuit is responsive to the complement of the data input signals and the clock signal for generating a start signal which is synchronized with the clock signal. The counter circuit is responsive to the start signal and the complement of the clock signal for generating a gated clock signal. The pattern detector circuit is responsive to the start signal, the data input signals, and the gated clock signal for sampling of the data input signals and for generating a synchronized output signal upon detection of a predetermined data sequence indicative of the preamble pattern.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

It is to be distinctly understood at the outset that the present invention shown in association with a StarLAN coded data transceiver is not intended to serve as a limitation upon the scope or teachings thereof, but is merely for the purpose of convenience of illustration of one example of its application. The present invention has numerous applications in other fields and apparatuses since the invention pertains to a preamble search and synchronizer circuit which allows for the rapid detection of a preamble pattern within data input signals and synchronizing it with a clock signal to produce a synchronized signal.

Figure 1:
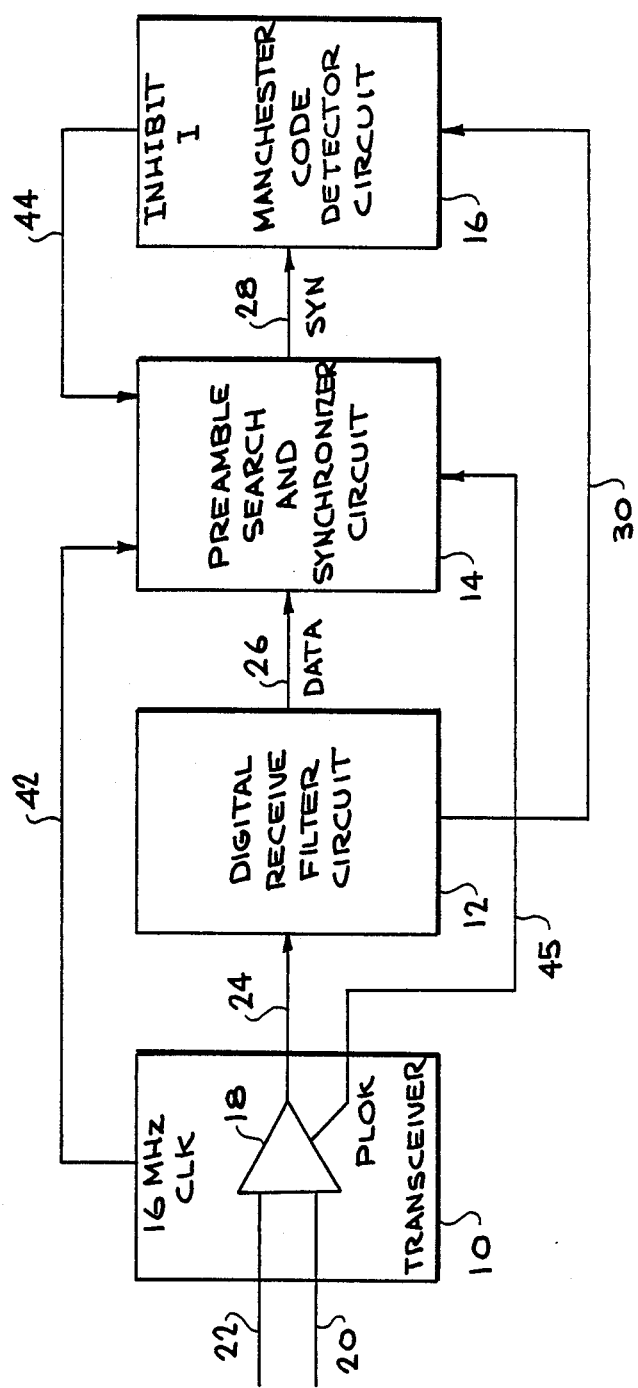
FIG. 1 is a block diagram illustrating a portion of a StarLAN communication network in which the preamble search and synchronizer circuit of the present invention is used.

Referring now to the drawings, there is shown in FIG. 1 in block diagram form a portion of a communication network which includes a StarLAN coded data transceiver 10, a digital receive filter circuit 12, a preamble search and synchronizer 14, and a Manchester code detector circuit 16. The transceiver 10 includes digital receiver circuitry 18 which has its inputs connected to lines 20 and 22 for receiving differential input signals and for converting the same to a single-ended digital data input signal at its output on line 24. The signal-ended input signal is fed to the input of the digital receive filter circuit 12 which produces a filtered data signal on its output on line 26. The details of the digital receive filter circuit 12 is described in a co-pending application Ser. No. 021,291 filed on Mar. 3, 1987 in the names of the same inventors and assigned to the same assignee as this application. The filtered data input signal defines a serial data input signal DATA containing a preamble pattern which is delivered to the input of the preamble search and synchronizer circuit 14 of the present invention. The output of the preamble search and synchronizer circuit 14 is on line 28 and defines a synchronized output signal SYN. This synchronized output signal functions as an enabling signal and is fed to the input of the Manchester code detector circuit 16. It will be noted that the detector circuit 16 also receives directly the filtered data input signal from the filter circuit 12 via line 30. Thus, the synchronized signal is used to enable the detector circuit 16 for decoding of the filtered data input signal.

Figure 2:
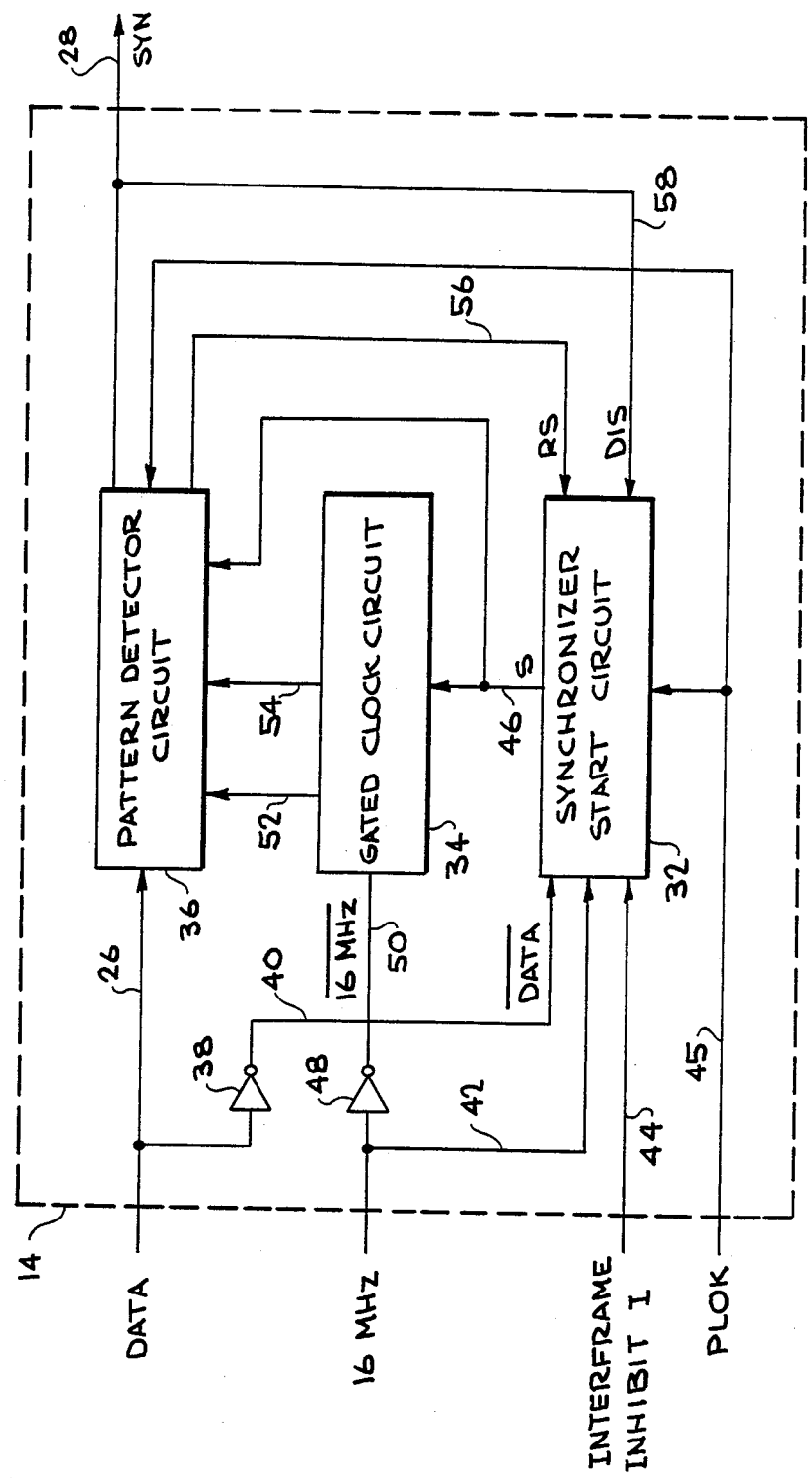
FIG. 2 is a block diagram of the preamble search and synchronizer circuit of the present invention.

In FIG. 2, there is shown a block diagram of the preamble search and synchronizer circuit 14 of FIG. 1. The circuit 14 searches for a preamble pattern in the incoming data input signals DATA which is received on its input on the line 26. The preamble pattern is required in StarLAN applications to be transmitted prior to the start of a serial data packet or message. This StarLAN preamble pattern is a data stream consisting of alternating 1 us high or logic "1" levels and 1 us low or logic "0" levels that is repeated for 64 bit times. Since the preamble pattern is Manchester encoded and is transmitted at the rate of 1 MHz, this results essentially in a 500 KHz squarewave. The preamble search and synchronizer circuit 14 comprises a synchronizer start circuit 32, a gated clock circuit 34, and a pattern detector circuit 36.

The synchronizer start circuit 32 receives as a first input an inversion of the incoming data input signal DATA appearing on the line 26 via an inverter 38 and input line 40. A second input of the start circuit 32 is on line 42 from an internally generated 16 MHz clock signal CLK which is produced by other parts (not shown) of the transceiver 10. A third input of the start circuit is an interframe inhibit signal I on line 44 which is also generated by other parts of the receiver. New messages are capable of being synchronized only when the inhibit signal I is at a logic "1" level. The inhibit signal I is set to a logic "0" for a fixed period of time after the end of transmission of a message and is then reset to the logic "1" level. This serves to guarantee a minimum period of time between message receptions. A fourth input to the start circuit is a trigger signal PLOK on line 45 which is used to indicate that data signals are being received when it is at a logic "1" level and thus allows operation of the preamble search and synchronizer circuit 14. The trigger signal PLOK is derived from a part of the digital line receiver circuitry 18. The start circuit 32 is triggered by the incoming data signals and generates a start signal S on line 46 which is used to activate both the clock circuit 34 and the detector circuit 36.

The gated clock circuit 34 receives an inversion of the 16 MHz clock pulses or signal CLK appearing on the line 42 via an inverter 48 and input line 50. The gated clock circuit 34 functions as a counter/divider for the 16 MHz clock pulses to provide a 2 MHz clock signal C1 on line 52 and a 4 MHz clock signal C2 on line 54. The clock signals C1 and C2 are fed as inputs to the pattern detector circuit 36. The detector circuit also receives as an input the incoming data input signals DATA containing the preamble pattern on the line 26. The frequency of the clock signal C1 is two times the transmitted data rate (1 MHz) of the input data signals DATA and is used to sample the same into a three-stage shift register of the pattern detector circuit 36. The data levels of the shift register is detected or decoded by a particular input data sequence in order to indicate a starting sequence of the preamble pattern in the data signals DATA. Upon such detection, an output latch in the detector circuit 36 is set to a logic "1" level which is the synchronized output signal SYN on its output on the line 28. The synchronized output signal is switched to the logic "1" level at a predetermined phase relationship to the incoming data input signals DATA. This synchronized signal is used to enable the Manchester code detector 16 as well as initializing other circuits in the transceiver.

The pattern detector circuit 36 also generates a restart signal RS on line 56 and a disable signal DIS on line 58 which are fed to the synchronizer start circuit for resetting the synchronizer start circuit, gated clock circuit 34, and pattern detector circuit 36 in order to start up the preamble search and synchronizer circuit again. The trigger signal PLOK on the line 45 will go low at the end of the message or data transmission for resetting the output latch and will go back to a high level when a new message is being received.

Figure 3:
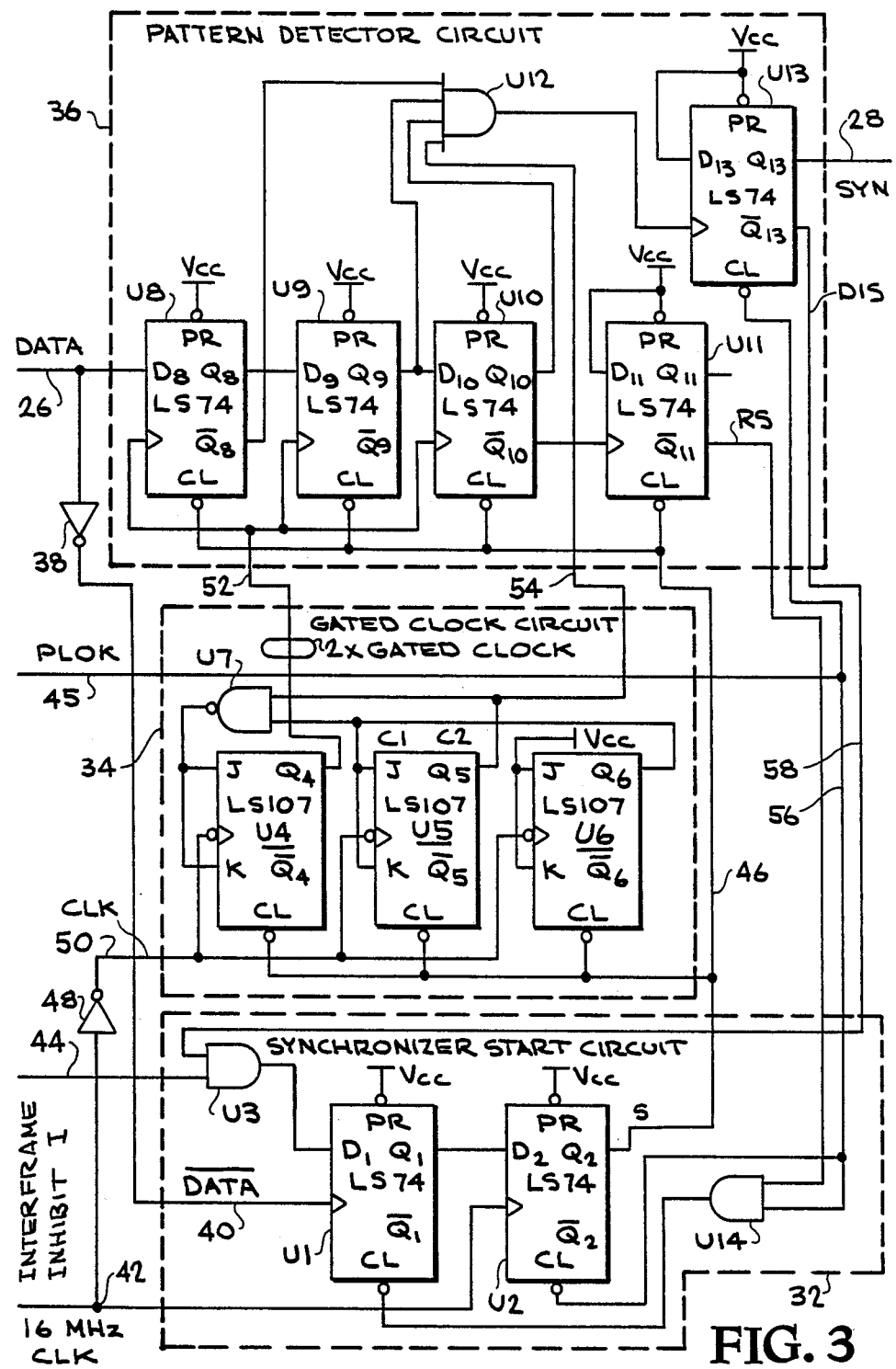
FIG. 3 is a detailed schematic circuit diagram of the preamble search and synchronizer circuit of the present invention for use with digital receiver circuitry in a StarLAN coded data transceiver.

In FIG. 3 there is illustrated a detailed schematic circuit diagram for the blocks 32, 34 and 36 of FIG. 2. The synchronizer start circuit 32 comprises a pair of D-type flip-flops U1 and U2 and a pair of AND logic gates U3 and U14. The flip-flop U1 has its data input D1 connected to the output of the logic gate U3 and its true output Q1 connected to the data input D2 of the flip-flop U2. The inverted or complement data input signal $\overline{\text{DATA}}$ is fed to the clock terminal of the flip-flop U1, and the 16 MHz clock signal CLK is fed to the clock terminal of the flip-flop U2. The inhibit signal I on the line 44 is fed to one input of the logic gate U3. The clear terminal of the flip-flop U1 is connected to the output of the logic gate U14. The clear terminal of the flip-flop U2 is connected to the trigger signal PLOK on the line 45 which is also connected to an input of the logic gate U14.

The gated clock circuit 34 comprises three J-K flip-flops U4, U5 and U6 and a NAND logic gate U7. A can be seen, the flip-flop U4 has its J and K terminals connected together and to the output of the logic gate U7. The true output Q4 of the flip-flop U4 provides the 2 MHz gated clock signal C1 on the line 52. The flip-flop U5 has its J and K terminals connected together and to an input of the logic gate U7. The true output Q5 of the flip-flop U5 is connected to another input of the logic gate U7. The flip-flop U6 has its K and J terminals connected together and to a supply potential VCC. The true output Q6 of the flip-flop U6 is connected to the J and K terminals of the flip-flop U5. The inverted or complement 16 MHz clock signal $\overline{\text{CLK}}$ is applied to the clock terminals of the flip-flops U4, U5 and U6. The clear terminals of the flip-flops U4, U5 and U6 are connected to the start signal S at the true output Q2 of the flip-flop U2 in the synchronizer start circuit 42. The true output Q5 of the flip-flop U5 provides the 4 MHz clock signal C2 on the line 54.

The pattern detector circuit 36 comprises D-type flip-flops U8, U9, U10, U11 and U13 and an AND logic gate U12. The flip-flops U8, U9 and U10 function as a three-stage shift register. The logic gate U12 serves as a decoder for detecting a particular data level at the outputs of shift register. The flip-flop U11 is used to generate the restart signal RS. The flip-flop U13 functions as an output latch which produces the synchronized output signal SYN. The flip-flop U8 of the shift register has its data input D8 connected to the line 26 for receiving the serial data input signals DATA, its true output Q8 connected to the data input D9 of the flip-flop U9, and its complement output $\overline{Q8}$ connected to a first input of the logic gate U12. The flip-flop U9 has its true output Q9 connected to the data input D10 of the flip-flop U10 and to a second input of the logic gate U12. The flip-flop U10 has its true output Q10 connected to a third input of the logic gate U12 and its complement output $\overline{Q10}$ connected to the clock terminal of the flip-flop U11. The clock terminals of the flip-flops U8, U9 and U10 are connected to the 2 MHz clock signal C1 on the line 52. The clear terminals of the flip-flops U8, U9, U10 and U11 are also connected to the start signal S at the true output Q2 of the flip-flop U2 in the synchronizer start circuit 32.

The data input D11 of the flip-flop U11 is connected to the supply potential VCC. The complement output $\overline{Q11}$ produces the restart signal RS on the line 56 and is fed to a second input of the logic gate U14 in the synchronizer start circuit 32. The data input D13 of the flip-flop U13 is connected to the supply potential VCC. The true output Q13 of the flip-flop U13 is connected to the line 28 to provide the synchronized output signal SYN. The complement output $\overline{Q13}$ provides the disable signal DIS on the line 58 which is fed as a second input to the logic gate U3 in the synchronizer start circuit. The logic gate U12 has a fourth input which is connected to the 4 MHz clock signal C2 on the line 54 from the gated clock circuit 34. The output of the logic gate U12 is connected to the clock terminal of the flip-flop U13. The clear terminal of the flip-flop U13 receives the trigger signal PLOK on the line 45.

For completeness in the disclosure of the above-described circuits, but not for purposes of limitation, the following component identifications are submitted. Those skilled in this art will recognize that alternative components to those described above may be employed in constructing the circuits in accordance with the present invention. While the circuits of FIG. 3 are shown as discrete components, it should be understood that in the preferred embodiment of the present invention the preamble search and synchronizer circuit is implemented as a portion of the same monolithic integrated circuit containing the transceiver.

| COMPONENT | PART NUMBER |
| --- | --- |
| U1,U2,U8,U9,U10,U11,U13 | 74LS74 |
| U4,U5,U6 | 74LS107 |
| U3,U7,U14 | 74LS08 |
| U12 | 74LS21 |

Figure 4:
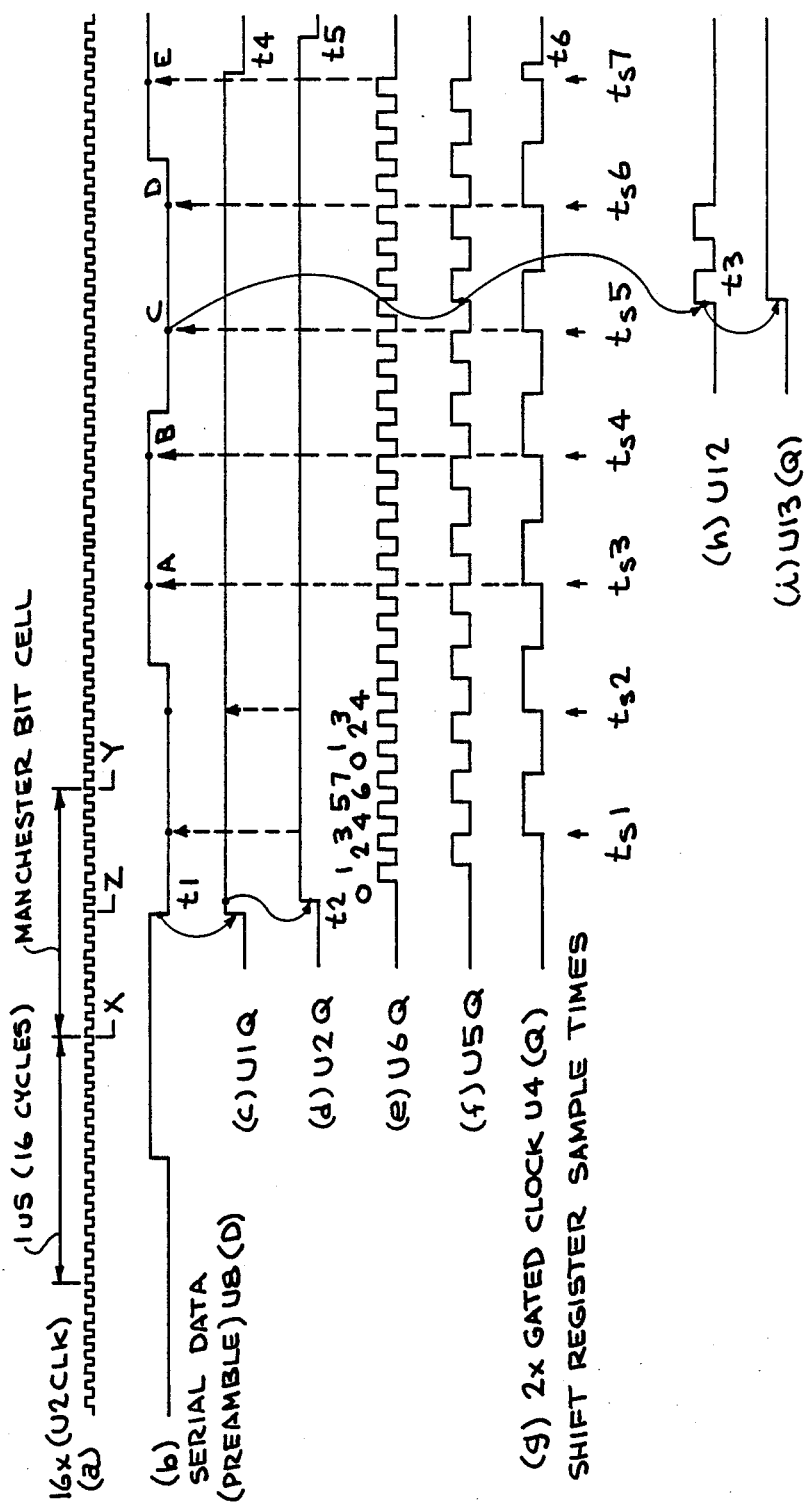
FIGS. 4(a)–4(i) are waveforms useful in understanding the operation of the present invention of FIG. 3.

In order to provide an understanding of the operation of the preamble search and synchronizer circuit 14 of the present invention, reference is now made to FIG. 4 of the drawings which illustrates the waveforms appearing at various points in the circuit of FIG. 3. Initially, it is assumed that the inhibit signal I is at a logic "1" level and the trigger signal PLOK is at a logic "1" level. Further, it will be assumed that the output latch U13 is reset so that the complement output $\overline{Q13}$ is at a high logic level (Q13=1). As a result, the true outputs of the flip-flops U1, U2, U4, U5, U6, U8, U9, U10, U11 and U13 will be at a low logic level.

The clock terminal of the flip-flop U2 in the synchronizer start circuit 32 receives the 16 MHz clock signal CLK on its input line 42 which is shown in FIG. 4(a). A typical Manchester bit cell is designated in FIG. 4(a) with points X and Y corresponding to boundary-cell transitions and point Z corresponding to a mid-cell transition. As will be recalled, the serial incoming data input signals DATA containing a preamble pattern is a 500 KHz squarewave illustrated in FIG. 4(b) and the complement of which is applied to the clock terminal of the flip-flop U1. Since the output of the logic gate U3 is at the logic "1" level, the true output Q1 of the flip-flop U1 will be clocked to a logic "1" level upon the next low-to-high transition of the input data signal $\overline{DATA}$ which corresponds to a high-to-low transition of the signal DATA at the time t1. Thus, the true output Q1 will be switched to the logic "1" level at the time t1 and is shown in FIG. 4(c). The true output Q1 is synchronized with the 16 MHz signal CLK by the flip-flop U2 whose output is shown in FIG. 4(d). The true output Q2 will be switched to the logic "1" level at the time t2. This true output Q2 is the start signal S and is sent to the clear terminals of the flip-flop U4, U5, U6 of the gated clock circuit and the flip-flops U8, U9, U10, U11 of the detector circuit, which is used to activate the same.

The J-K flip-flops U4, U5, U6 and the logic gate U7 form an eight-state synchronous binary counter which will now start to divide down the complement 16 MHz clock signal $\overline{CLK}$. The true outputs Q6, Q5 and Q4 of the flip-flops provide respective 8 MHz, 4 MHz, and 2 MHz gated clock signals which are depicted in corresponding FIGS. 4(e), 4(f), and 4(g). The 2 MHz gated signal C1 is fed to the clock terminals of the flip-flops U8, U9 and U10 of the shift register in the detector circuit 36 for sampling of the serial data input signals DATA applied to the data input D8 of the flip-flop U8. The sample times of the shift register are designated ts1 through ts7 in FIG. 4(g). Thus, the serial data signal DATA containing the preamble pattern of FIG. 4(b) is being sampled twice each time it is in the low level and twice each time it is in the high level. By comparing the sample times of FIG. 4(g) with the Manchester bit cell of FIG. 4(a), it can be seen that the sampling occurs away from both the mid-cell transition (point z) and the boundary-cell transitions (points X and Y) so as to eliminate interference from noise which may cause an inaccurate sampling.

The logic gate U12 functions as a decoder to detect a sampled input data sequence of 110 (corresponding to Q8=0; Q9=1; and Q10=1) when the preamble pattern is present. This occurs at the sample time ts5 which is indicated by the points A, B and C in the waveform of FIG. 4(b). As a result, the output of the logic gate U12 will be switched to a logic "1" level when the next pulse of the 4 MHz clock signal C2 (FIG. 4(f)) goes to a logic "1". This occurs at the time t3 which is shown in FIG. 4(h). The clock signal C2 is used to provide a certain amount of delay before the decoder samples the outputs of the shift register in order to avoid any interference from noise. Consequently, the true output Q13 of the flip-flop U13 is caused to be set to a logic "1" which is depicted in FIG. 4(i). This true output Q13 is the synchronized output signal SYN which is at a predetermined phase relationship with the incoming data signal and is used to enable the Manchester code detector circuit 16.

Thereafter, the data input signals DATA are continued to be sampled and shifted into the shift register until a high-to-low transition occurs at the true output Q10. Such a transition occurs at the sample time ts7 corresponding to the point E in the data signal of FIG. 4(b). The complement output $\overline{Q10}$ will thus make a low-to-high transition to cause setting of the true output Q11 to a logic "1" level. As a result, the complement output $\overline{Q11}$ will be at a logic "0" level which causes the synchronizer start circuit 32 to be reset (Q1=0; Q2=0) via the logic gate U14 and the clear terminals of the flip-flops U1, U2. This can be seen at the times t4 and t5 in the respective waveforms of FIGS. 4(c) and 4(d). Since the start signal S is at the low logic level (Q2=0), the gated clock signal C1 is turned off at the time t6 shown in FIG. 4(g). It will be noted that the synchronizer start circuit 32 is prevented from further operation due to the fact that the complement output $\overline{Q13}$ will be now at a logic "0" level, thereby inhibiting the logic gate U3.

At the end of the transmission of the message, both the trigger signal PLOK and the inhibit signal I will go to a low logic level. By going low, the trigger signal PLOK resets the output latch. The inhibit signal I will remain low for a fixed period of time after the resetting of the output latch and will go back to the high logic level thereafter so as to enable the logic gate U3. When a new message is received, the trigger signal PLOK will go back to the high logic level and allow the search for the preamble pattern to start again.

If the preamble pattern is not detected, the synchronizer start circuit 32 will automatically reset when the true output Q10 of the flip-flop U10 changes from logic "1" to logic "0". The synchronizer start circuit will be re-initialized upon the next low-to-high transition on the inverted data signal $\overline{DATA}$ applied to the clock terminal of the flip-flop U1, thereby allowing a new search for the preamble pattern.

From the foregoing detailed description, it can thus be seen that the present invention provides a preamble search and synchronizer circuit which allows for the rapid detection of a preamble pattern in the incoming data input signals and synchronizes it with the clock signal to produce a synchronized output signal. The preamble search and synchronizer circuit is formed of a synchronizer start circuit, a gated clock circuit, and a pattern detector circuit. Further, the preamble search and synchronizer circuit of the present invention is capable of being fabricated with a StarLAN coded data transceiver as part of a single monolithic integrated circuit.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A preamble search and synchronizer circuit for detecting a preamble pattern within data input signals and for synchronizing it with a clock signal associated with a starLAN coded data transceiver, said preamble search and synchronizer circuit comprising:
   input means for receiving data input signals and a clock signal and for generating the complement of the data input signals and the complement of the clock signal;
   synchronizer start means responsive to the complement of the data input signals and the uncomplemented clock signal for generating a start signal which is synchronized with the uncomplemented clock signal;
   counter means responsive to the start signal and the complement of the clock signal for generating a gated clock signal; and
   pattern detector means responsive to the start signal, the data input signals and the gated clock signal for sampling the data input signals and for generating a synchronized output signal upon detection of the preamble pattern.

2. A preamble search and synchronizer as claimed in claim 1, wherein said synchronizer start means includes first and second D-type flip-flops, said first flip-flop receiving the complement of the data input signals at its clock terminal and its true output connected to the data input of said second flip-flop, said second flip-flop receiving the clock signal at its clock terminal and its true output connected to said counter means and said pattern detector means to provide the start signal.

3. A preamble search and synchronizer circuit as claimed in claim 2, wherein said counter means comprises a synchronous binary counter formed of first, second and third J-K flip-flops and a NAND logic gate to provide the gated clock signal.

4. A preamble search and synchronizer circuit as claimed in claim 3, wherein said pattern detector means comprises a three-stage shift register formed of third, fourth and fifth D-type flip-flops whose clock terminals are connected to receive the gated clock signal.

5. A preamble search and synchronizer circuit as claimed in claim 4, wherein said pattern detector circuit further comprises decoder means for decoding the true and complement outputs of said third, fourth and fifth D-type flip-flops, and an output latch connected to the output of said decoding means for providing the synchronized output signal.

6. A preamble search and synchronizer circuit as claimed in claim 5, wherein said decoder means is formed of an AND logic gate and said output latch is formed of a sixth D-type flip-flop, the true output of said sixth D-type flip-flop providing the synchronized output signal and which makes a low-to-high transition upon detection of the preamble pattern.

7. A preamble search and synchronizer circuit as claimed in claim 6, further comprising resetting means responsive to the complement output of the fifth D-type flip-flop of said shift register for automatically resetting said synchronizer start means when the preamble pattern is not detected and the true output of the said fifth D-type flip-flop makes a high-to-low transition.

8. A preamble search and synchronizer circuit as claimed in claim 7, wherein said resetting means is formed of a seventh D-type flip-flop having its data input connected to a supply potential, its clock terminal connected to the complement output of the fifth D-type flip-flop, and its complement output coupled to the clock terminal of said first and second D-type flip-flops.

9. A preamble search and synchronizer circuit as claimed in claim 8, wherein said synchronizer start means further comprises inhibiting means for preventing further operation of said preamble search and synchronizer circuit for a fixed period of time after the end of transmission of a message.

10. A preamble search and synchronizer circuit as claimed in claim 1, wherein said preamble search and synchronizer circuit is formed as a part of a single monolithic integrated circuit.

11. A preamble search and synchronizer circuit for detecting a preamble pattern within data input signals and for synchronizing it with a clock signal associated with a starLAN coded data transceiver, said preamble search and synchronizer circuit comprising:

input means for receiving data input signals and a clock signal and for generating the complement of the data input signals and the complement of the clock signal;

synchronizer start means responsive to the complement of the data input signals and the uncomplemented clock signal for generating a start signal which is synchronized with the uncomplemented clock signal;

counter means responsive to the start signal and the complement of the clock signal for generating a first gated clock signal and a second gated clock signal;

pattern detector means responsive to the start signal, the data input signals, the first gated clock signal and the second gated clock signal for sampling the data input signals and for generating a synchronized output signal upon detection of the preamble pattern; and said pattern detector means including shift register means connected to receive the first gated clock signal for shifting the sampled input signals and decoder means connected to the outputs of said shift register means and the second gated clock signal for detecting the preamble pattern.

12. a preamble search and synchronizer as claimed in claim 11, wherein said synchronizer start means includes first and second D-type flip-flops, said first flip-flop receiving the complement of the data input signals at its clock terminal and its true output connected to the data input of said second flip-flop, said second flip-flop receiving the clock signal at its clock terminal and its true output connected to said counter means and said pattern detector means to provide the start signal.

13. A preamble search and synchronizer circuit as claimed in claim 12, wherein said counter means comprises a synchronous binary counter formed of first, second and third J-K flip-flops and a NAND logic gate to provide the gated clock signal.

14. A preamble search and synchronizer circuit as claimed in claim 13, wherein said shift register means is formed of third, fourth and fifth D-type flip-flops whose clock terminals are connected to receive the first gated clock signal.

15. A preamble search and synchronizer circuit as claimed in claim 14, further comprising resetting means responsive to the complement output of the fifth D-type flip-flop of said shift register means for automatically resetting said synchronizer start means when the preamble pattern is not detected and the true output of the said fifth D-type flip-flop makes a high-to-low transition.

16. A preamble search and synchronizer circuit as claimed in claim 15, wherein said resetting means is formed of a sixth D-type flip-flop having its data input connected to a supply potential, its clock terminal connected to the complement output of the fifth D-type flip-flop, and its complement output coupled to the clock terminal of said first and second D-type flip-flops.

17. A preamble search and synchronizer circuit as claimed in claim 16, wherein said synchronizer start means further comprises inhibiting means for preventing further operation of said preamble search and synchronizer circuit for a fixed period of time after the end of transmission of a message.

18. A preamble search and synchronizer circuit as claimed in claim 11, wherein said preamble search and synchronizer circuit is formed as a part of a single monolithic integrated circuit.

19. A preamble search and synchronizer circuit comprising:

input means for receiving data input signals and a clock signal and for generating the complement of the data input signals and the complement of the clock signal;

synchronizer start means responsive to the uncomplemented clock signal and complement of the data input signals for generating a start signal which is synchronized with the uncomplemented clock signal;

counter means responsive to the start signal and the complement of the clock signal for generating a gated clock signal; and pattern detector means responsive to the start signal, the data input signals and the gated clock signal for sampling the data input signals and for generating a synchronized output signal upon detection of a preamble pattern contained within the data input signals.

20. A preamble search and synchronizer circuit as claimed in claim 19, wherein said preamble search and synchronizer circuit is formed as a part of a single monolithic integrated circuit.

* * * * *